No. 616,039. Patented Dec. 13, 1898.
A. F. TIROT & A. GUYOT.
TIME FUSE.
(Application filed Dec. 7, 1897.)
(No Model.) 3 Sheets—Sheet I.
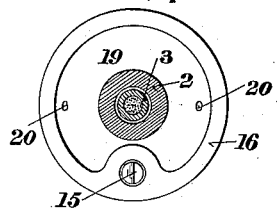
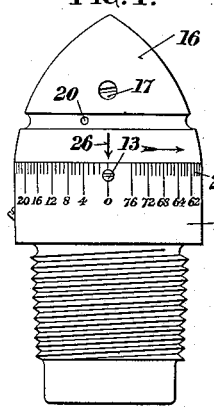
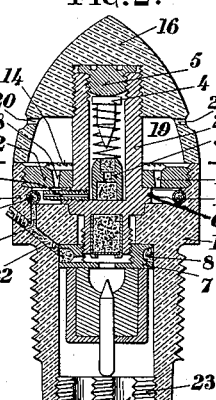
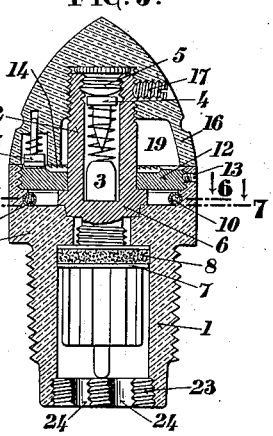
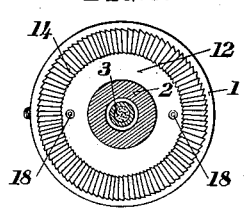
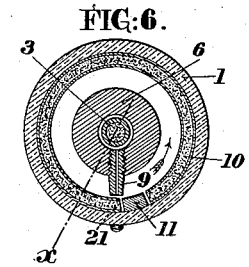
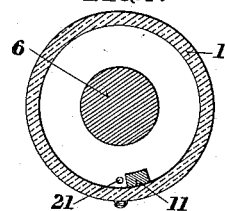
Witnesses:
John Chalmers Wilson
Percy C. Bowen
Inventors:
A. F. Tirot
A. Guyot
by Wilkinson & Fisher
Attorneys.

No. 616,039. Patented Dec. 13, 1898.
A. F. TIROT & A. GUYOT.
TIME FUSE.
(Application filed Dec. 7, 1897.)
(No Model.) 3 Sheets—Sheet 2.
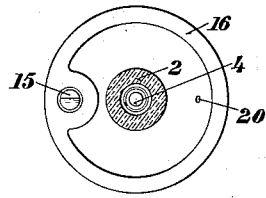
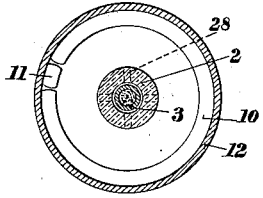
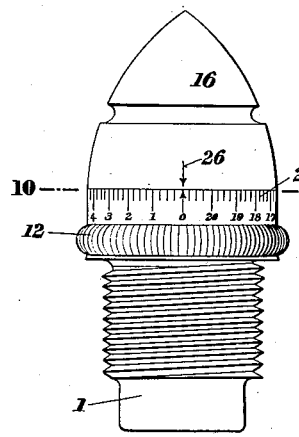
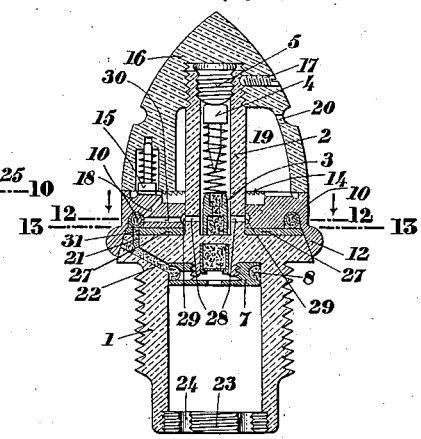
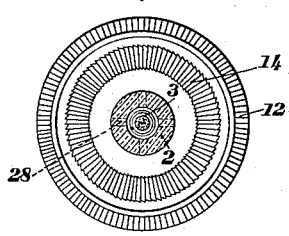
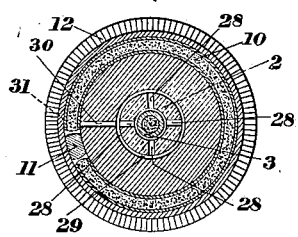
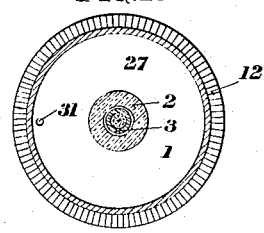
Witnesses:
Inventors:

No. 616,039. Patented Dec. 13, 1898.
A. F. TIROT & A. GUYOT.
TIME FUSE.
(Application filed Dec. 7, 1897.)
(No Model.) 3 Sheets—Sheet 3.
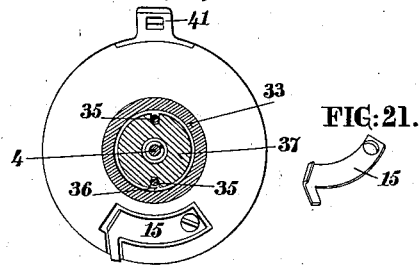
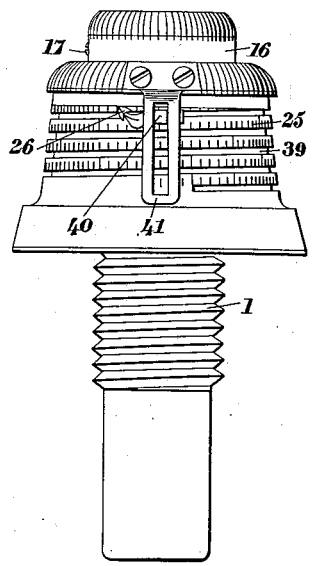
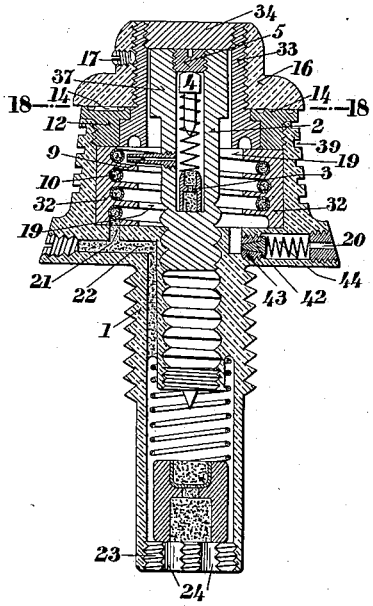
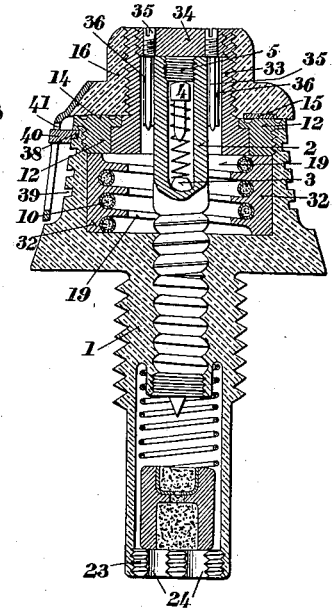
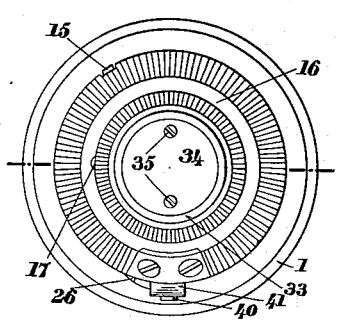
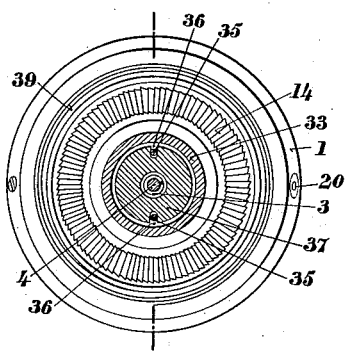
Witnesses:
Inventors:
A. F. Tirot
A. Guyot
by Wilkinson & Fisher
Attorneys.

UNITED STATES PATENT OFFICE.

ADOLPHE FRANÇOIS TIROT, OF BRUYÈRES DE SÈVRES, AND ANTOINE GUYOT, OF SEVRES, FRANCE.

TIME-FUSE.

SPECIFICATION forming part of Letters Patent No. 616,039, dated December 13, 1898.

Application filed December 7, 1897. Serial No. 661,106. (No model.)

*To all whom it may concern:*

Be it known that we, ADOLPHE FRANÇOIS TIROT, residing at Bruyères de Sèvres, and ANTOINE GUYOT, residing at Sevres, Seine-et-Oise, France, citizens of the Republic of France, have invented a certain new and useful Improvement in Time-Fuses, (for which we have obtained two patents in France, No. 251,176, bearing date October 22, 1895, with an addition dated October 2, 1897, and No. 265,070, bearing date March 16, 1897,) of which the following is a specification.

The present improvement relates to that class of time-fuses in which the time-train proper consists of a lead tube or sheathing containing powder, the tube or sheathing being subjected to compression and drawn down to a suitable diameter and in which there is no necessity of punching any hole in the fuse, the sheathing being cut by the gases and the operation of setting being alone necessary preparatory to firing.

Broadly speaking, a time-fuse manufactured according to the hereinbefore-mentioned principle comprises a time-train of the kind described placed within close proximity to the open end of a nozzle, duct, or channel through which the gases escape from the detonator-chamber, such nozzle or duct being adjustable with reference to the time-train for obvious reasons.

The present invention likewise includes certain details of construction which relate to means for preventing the adjustable portion of the fuse from rotating by virtue of inertia as the projectile leaves the gun and to means for controlling, if necessary, the escape of the gases developed within the detonator-chamber.

A fuse of this kind may be constructed in many different ways and yet operate as hereinbefore described.

In the accompanying drawings we have shown, by way of example, three different constructions. In these constructions the time-fuse is intended for use in the head of a projectile; but it will be readily understood without further description and illustration that it can likewise be constructed so that, while retaining its characteristic features, it can also be applied to the base of a projectile.

Figures 1 to 7 show a first construction in which the time-train is fixed and the firing-nozzle movable. Figs. 8 to 14 show a second but different construction in which the time-train is movable and the nozzle fixed, while Figs. 15 to 20 show a third form in which the time-train is helicoidal in form and fixed, while the firing-nozzle moves spirally.

Referring more particularly to the several views, Fig. 1 is an elevation of the fuse. Fig. 2 is a section of the same. Fig. 3 is a cross-section on the line 3 3 of Fig. 2 looking downward. Fig. 4 is a cross-section on the line 3 3 of Fig. 2 looking upward. Fig. 5 is a vertical section taken at right angles to Fig. 2. Fig. 6 is a cross-section on the line 6 6 of Fig. 5. Fig. 7 is a cross-section on the line 7 7 of Fig. 5. Fig. 8 is an elevation of a modified form of the fuse. Fig. 9 is a section of the same. Fig. 10 is a cross-section on the line 10 10 of Fig. 8 looking downward. Fig. 11 is a cross-section on the line 10 10 of Fig. 8 looking upward. Fig. 12 is a cross-section on the line 12 12 of Fig. 9. Fig. 13 is a cross-section on the line 13 13 of Fig. 9 looking downward. Fig. 14 is a cross-section on the line 13 13 of Fig. 9 looking upward. Fig. 15 is an elevation of another modified form of the fuse, in which the time-train is helicoidal to give increased length. Fig. 16 is a plan of the same. Fig. 17 is a vertical section of the same. Fig. 18 is a cross-section on the line 18 18 of Fig. 17 looking downward. Fig. 19 is a cross-section on the line 18 18 of Fig. 17 looking upward. Fig. 20 is a vertical section taken at right angles to Fig. 17, and Fig. 21 is a detail.

Referring to Figs. 1 to 7, showing a construction in which the time-train is annular, the body 1 of the fuse, which is screw-threaded, as usual, for its insertion into the head of the projectile contains a central tubular stem 2, in which are located the usual detonator 3 and detonating-plunger 4 and a plug 5 closing the said stem 2 at the top. The stem 2 has formed on it a flange 6, which fits into a corresponding central cavity in the body 1, and it is threaded at its lower end to receive a nut 7, having a peripheral groove filled with powder 8, and also having ducts for leading the flame downward. Projecting from the stem 2 is a nozzle 9, which communicates with the detonator-chamber and opens into close proximity with the time-train 10, placed in the bottom of the cavity in the body 1 and assuming the shape of an incomplete annulus, the two ends of which lie against a block 11, fastened to the body 1. (See Figs. 6 and 7.) The main object of the block 11 is to separate the two ends of the time-train, so as to prevent them from communicating with each other. A further object of the said block is to prevent the time-train from being displaced inside the body 1, while rotation is being imparted to the projectile. Over the stem is loosely slipped a ring 12, which screws into the cavity of the body 1 and is held in place by a screw 13. The upper face of the ring 12 is provided with ratchet-teeth 14, with which coöperates a spring-pawl 15, Figs. 4 and 5, located in a recess of the cap 16, which is screwed to the top of the stem 2 and held thereon by a screw 17. In the ring 12 are formed one or more holes 18, which conduct the gases developed by the time-train 10 into a chamber 19 of the cap 16, and thence into the open air through one or more vent-holes 20. Below the time-train 10 is formed in the body 1 a compound duct 21 22, Figs. 2, 6, and 7, filled with powder and opening into close proximity with the powder 8, contained in the nut 7. The body 1 is closed at the bottom by the usual plug 23, having peripheral openings 24 for the free passage, as usual, of the gases developed in the fuse to the projectile itself, to which the time-fuse is applied. The body 1 is arbitrarily graduated at 25, and the cap 16 has a mark or an index 26 formed upon it, coöperating with the graduated scale 25.

The fuse can be used either separately as a time-fuse proper or it may be combined with a percussion-fuse, so as to form what is known as a "combination-fuse." By way of an example we have illustrated the herein-described time-fuse as combined with the Hotchkiss percussion-fuse, which, being well known, does not need any description beyond the illustration given in Figs. 2 and 5.

The operation is as follows: In the drawings the time-fuse is shown set at zero, so that the projectile to which the fuse is applied would be made to explode almost immediately on leaving the gun, since the gases developed in the detonator-chamber, finding their way through the nozzle 9, will impinge against the time-train 10 at the place shown in Fig. 6 and cut the same—that is to say, pierce the leaden sheeting and ignite the powder—whereupon the time-train will burn; but long before it is completely consumed the flame will instantly communicate with the compound duct 21 22, burn out the powder therein contained, and then ignite the powder 8, surrounding the nut 7, after which the fire will find its way in the usual manner to the charge contained in the projectile and cause the same to explode. Now when it is desired to set the time-fuse so that it shall cause the projectile to explode, say, twelve seconds after the latter has left the gun, the operator causes the cap 16 to rotate in the direction of the arrow, Figs. 1 and 6, (rotation in the other direction being prevented by the pawl 15, as hereinafter explained,) until the index 26 is opposite the division 12 of the graduated scale 25. In so doing the nozzle 9 will have been carried around with reference to the stationary time-train 10 until it occupies a corresponding position, (indicated, say, by the radial line $x$, Fig. 6,) at which point the time-train will be cut and ignited. The length of time elapsing while the time-train burns from the point $x$ to the point 21 added to the length of time required for the burning of the powder from the point 21 to the point at which the projectile is acted upon by the fire will be twelve seconds.

The object of the pawl 15 is to prevent the cap 16 and parts connected thereto from moving under the influence of the rotative impulsion imparted to the projectile by the rifling of the gun, so that when once set the cap shall not be liable nor likely to disturb the adjustment of the time-fuse.

Referring to Figs. 8 to 14, showing a further construction in which the time-train is also annular, the arrangement of the parts varies from the arrangement shown in Figs. 1 to 7 in that instead of the time-train being fixed and the nozzle being movable, as in the latter arrangement, the time-train is movable and the nozzle is fixed, the general disposition otherwise remaining substantially the same. Like parts are denoted by like numerals of reference. The body $1^a$ is integral with the central stem $2^a$, and the cap $16^a$ being screwed to the latter the three parts practically form one piece. Interposed between the cap $16^a$ and the body $1^a$ is the ring $12^a$, which in this instance is slipped over the stem $2^a$ and is free to be revolved around the stem, its periphery being milled for facilitating the operation. Between the ring $12^a$ and the body $1^a$ is slipped over the stem $2^a$ a washer or packing 27, made of leather or other suitable material. The communication between the detonator-chamber and the time-train is established by a series of ducts 28 28 28 28, formed radially in the wall of the stem $2^a$, Figs. 9 and 12, and issuing into an annular recess 29, formed in the ring $12^a$. From such recess starts a radial duct 30, which opens in close proximity with the time-train 10, sunk into a corresponding cavity in the ring $12^a$ and held against rotation in said ring. The travel of the gases from the detonator-chamber will therefore be through 28 28 28 28, through 29, and through 30 to the time-train 10 and from the time-train 10 through a hole 31, bored in the packing 27 in a line with the compound duct 21 22, through the latter, and thence to the projectile in the usual manner. The fuse is provided, as before, with a spring-pawl 15, coöperating with ratchet-teeth 14 on the top of the ring $12^a$ for the purpose already specified with reference to the former construction, and, if desired, it may also be provided with any suitable kind of percussion-fuse, (not shown)—such, for instance, as that shown in Figs. 2 and 5, whereby a combination time and percussion fuse may be provided. The operation of setting this construction of time-fuse is effected in this instance by rotating the milled ring $12^a$ until the index 26 on the cap $16^a$ coincides with the desired division on the graduated scale 25. The other parts not described, but indicated by numerals, correspond in construction and function to like parts indicated by similar numerals and fully described with reference to Figs. 1 to 7.

Referring to Figs. 15 to 21, showing a construction in which the time-train is helical, the arrangement of the parts varies from the two foregoing arrangements (shown in Figs. 1 to 7 and Figs. 8 to 14, respectively) in that instead of the time train being annular it assumes the shape of a coil, and that of the firing-nozzle instead of revolving in the same horizontal plane moves spirally alongside of the time-train. Like parts are denoted by like numerals of reference. The stem $2^b$, with its nozzle 9, is capable in this instance of being screwed into and out of the body $1^b$, so as to cause it to move against and follow the time-train $10^b$, which is placed in a helical groove cut into a cylindrical casing 32, let into the body $1^b$. In order to enable such stem $2^b$ to move up or down with reference to and yet to rotate with the cap $16^b$, which is only capable of revolving in the same plane, the cap $16^b$ and stem $2^b$ are connected together by a mechanical contrivance equivalent to a feather and key consisting of a sleeve 33, concentric to the stem, screwed into the cap $16^b$ and closed at the top by a screw-plug 34, in which are fastened two pins 35 35, engaging longitudinal grooves 36 36, formed on opposite sides of a head 37 on the stem $2^b$. The cap $16^b$ and sleeve 33 being made fast to each other by a screw $17^b$, it will be readily understood that by imparting rotary motion to the cap $16^b$ (the body $1^b$ remaining stationary) the stem $2^b$ will be caused to rotate, while at the same time, owing to the sliding connection of the pins 35 35 with the stem $2^b$, the latter will be free to move up or down when screwing into or out of the body $1^b$, whereby the nozzle 9 will be made to always remain against the time-train $10^b$. Interposed between the cap $16^b$ and the body $1^b$ is the ring $12^b$, which in this instance is slipped over the sleeve 33 and is screwed into the body $1^b$ until it bears firmly against the casing 32, in which position it may be held by a screw if necessary. The cap 16 is prevented from rotating in one direction by means of a spring-pawl $15^b$, located in the said cap and engaging ratchet-teeth $14^b$ on the top of the ring $12^b$. In this fuse the graduated scale $25^b$ instead of being in a circle is in a spiral, and the index $26^b$ instead of being a fixture is constituted by a movable part which by means of a feather 38 is in constant engagement with the spiral groove 39 and is held by a block 40, moving in a guide-frame 41, fastened to the cap $16^b$. It will be observed that the spiral groove 39, the groove containing the time-train $10^b$, and the screw-thread on the lower end of the stem $2^b$ are equal in pitch. There are one or more vent-holes $20^b$ for the escape of the gases developed by the time-train $10^b$ in the chamber 19. Between such chamber and vent hole or holes there is an advantage in applying a controlling-valve 42 (see Fig. 17) for the purpose of preventing the pressure of the outer air from influencing the combustion of the time-train. The said valve is pressed against its seat 43 by a spring 44. The fuse may also be provided with any suitable percussion apparatus—such, for instance, as the plunger 50, spring 51, and anvil 52. The other parts not particularly described correspond in structure and function with those indicated by similar numerals and fully described with reference to Figs. 1 to 7.

It is obvious that in the herein-described constructions of time-fuses two or more spring-pawls may be provided instead of only one, as shown, and that the arrangement of such pawls may be varied.

It will be noted that the spring-operated pawl 15 moves longitudinally parallel to the axis of the shell, and therefore when the shell is rotated rapidly there is no tendency of the pawl to fly out of engagement with the rack, due to centrifugal force. Moreover, the pawl and the spring for operating the same are completely inclosed, as are also the teeth of the rack, and these parts are not liable to become clogged up with dirt, grease, or to be injured or displaced in the operation of loading the gun.

We claim as new—

1. In a time-fuse, the combination, with a body-piece adapted to be screwed into the projectile of a hollow stem projecting from said body-piece, a detonator mounted in said stem and operated on discharge of the gun, a time-train mounted exterior to said stem, a duct connecting the interior of said stem to said time-train, a circular rack and a spring-operated pawl moving parallel to the axis of the shell for adjusting the relative positions of said duct and said time-train, and means for carrying the flame from the time-train to the interior of the shell, substantially as described.

2. In a time-fuse, the combination, with a body-piece, of a hollow stem projecting from said body-piece, a fulminate cap and explosive charge mounted in said stem, a plunger mounted in said stem and adapted to strike said fulminate cap when the projectile is fired, a time-train mounted exterior to said stem, a duct connecting the interior of said stem to said time-train, a circular rack and a spring-operated pawl moving parallel to the axis of the shell for adjusting the relative positions of said duct and said time-train, and means for carrying the flame from the time-train to the interior of the shell, substantially as described.

3. In a time-fuse, the combination, with a body-piece of a hollow stem projecting from said body-piece, a fulminate cap and explosive charge mounted in said stem, a plunger mounted in said stem and adapted to strike said fulminate cap when the projectile is fired, a spring interposed between said plunger and said cap and normally holding the plunger clear of the cap, a time-train mounted exterior to said stem, a duct connecting the interior of said stem to said time-train, a circular rack and a spring-operated pawl moving parallel to the axis of the shell for adjusting the relative positions of said duct and said time-train, and means for carrying the flame from the time-train to the interior of the shell, substantially as described.

4. In a time-fuse, the combination, with a body-piece with passages therein, of a stationary time-train consisting of slow-burning composition inclosed in a thin fusible metallic sheathing, and a detonator with adjustable means for carrying the flame from the detonator to the time-train, substantially as described.

5. In a time-fuse, the combination, with a body-piece adapted to be screwed into the projectile of a hollow stem projecting from said body-piece, a detonator mounted in said stem and operated on discharge of the gun, a time-train mounted exterior to said stem, a duct connecting the interior of said stem to said time-train, a ratchet-and-pawl arrangement consisting of a circular rack and a spring-operated pawl moving parallel to the axis of the shell for adjusting the relative positions of said duct and said time-train, and means for carrying the flame from the time-train to the interior of the shell, substantially as described.

6. In a time-fuse, the combination, with a body-piece adapted to be screwed into the projectile, of a hollow stem projecting from said body-piece, a fulminate cap and explosive charge mounted in said stem, a plunger mounted in said stem and adapted to strike said fulminate cap when the projectile is fired, a time-train mounted exterior to said stem, a duct connecting the interior of said stem to said time-train, a ratchet-and-pawl arrangement consisting of a circular rack and a spring-operated pawl moving parallel to the axis of the shell for adjusting the relative positions of said duct and said time-train, and means for carrying the flame from the time-train to the interior of the shell, substantially as described.

7. In a time-fuse, the combination, with a body-piece adapted to be screwed into the projectile, of a hollow stem projecting from said body-piece, a fulminate cap and explosive charge mounted in said stem, a plunger mounted in said stem and adapted to strike said fulminate cap when the projectile is fired, a spring interposed between said plunger and said cap and normally holding the plunger clear of the cap, a time-train mounted exterior to said stem, a duct connecting the interior of said stem to said time-train, a ratchet-and-pawl arrangement consisting of a circular rack and a spring-operated pawl moving parallel to the axis of the shell for adjusting the relative positions of said duct and said time-train, and means for carrying the flame from the train to the interior of the shell, substantially as described.

8. In a time-fuse, the combination, with the detonator-chamber and time-train, consisting of slow-burning composition inclosed in a thin sheathing and mounted in a chamber of the fuse, of a duct through which the gases generated in the detonator-chamber impinge against the time-train for the purpose of cutting and igniting the same, and means for adjusting the position of the duct relative to the time-train, substantially as described.

9. In a time-fuse, the combination, with the detonator-chamber and a time-train, consisting of slow-burning composition inclosed in a thin fusible metallic sheathing and mounted in a chamber of the fuse, of a duct through which the gases generated in the detonator-chamber impinge against the time-train for the purpose of cutting and igniting the same, and means for adjusting the position of the duct relative to the time-train, substantially as described.

10. In a time-fuse, the combination, with the detonator-chamber and time-train, consisting of slow-burning composition inclosed in a thin sheathing and mounted in a chamber of the fuse, of a duct through which the gases generated in the detonator-chamber impinge against the time-train, for the purpose of cutting and igniting the same, and means for adjusting the position of the duct relative to the time-train including a ratchet-and-pawl arrangement, substantially as described.

11. In a time-fuse, the combination, with the detonator-chamber and a time-train, consisting of slow-burning composition inclosed in a thin fusible metallic sheathing and mounted in a chamber of the fuse, of a duct through which the gases generated in the detonator-chamber impinge against the time-train, for the purpose of cutting and igniting the same, and means for adjusting the position of the duct relative to the time-train including a ratchet-and-pawl arrangement, substantially as described.

12. In a time-fuse, the combination with the detonator-chamber and a time-train, of a duct through which the gases generated in the detonator-chamber impinge against the time-train, and a ratchet-and-pawl arrangement for adjusting the position of the duct relative to the time-train, substantially as described.

In witness whereof we have hereunto set our hands, this 23d day of November, 1897, in presence of two subscribing witnesses.

ADOLPHE FRANÇOIS TIROT.
ANTOINE GUYOT.

Witnesses:
R. H. BRANDON,
EDWARD P. MACLEAN.